(No Model.) 2 Sheets—Sheet 1.
W. C. SMITH.
BICYCLE.
No. 506,741. Patented Oct. 17, 1893.
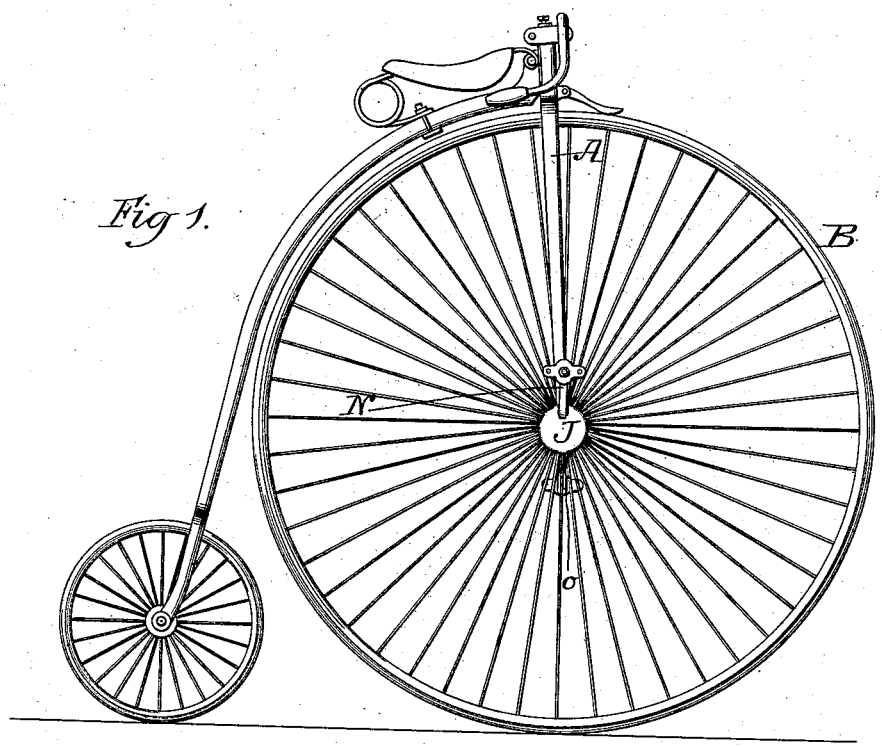
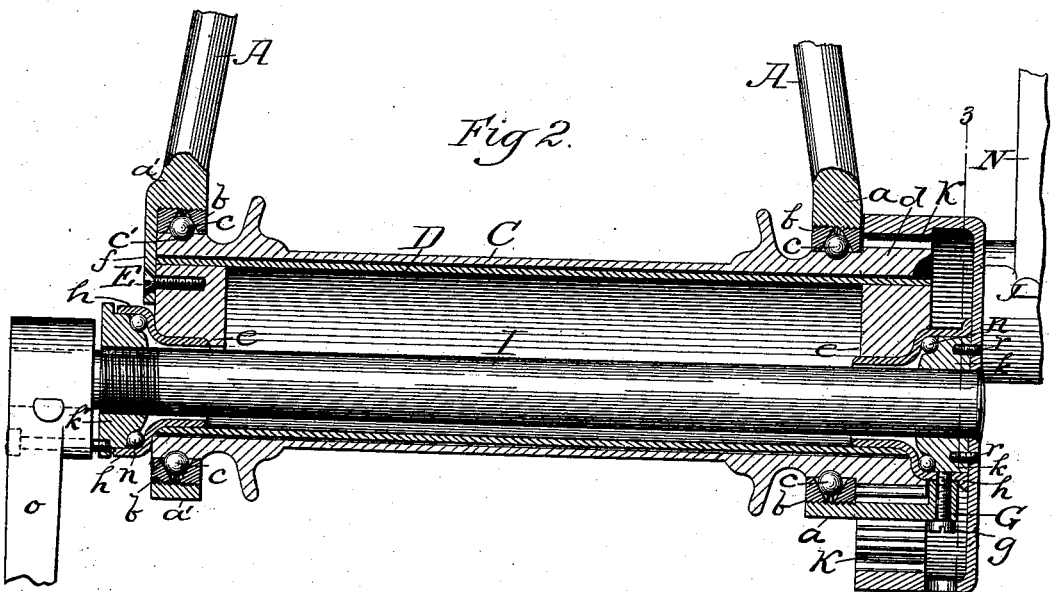
Witnesses
Inventor
William Church Smith
by Frank D. Thomason
Attorney.

(No Model.)  W. C. SMITH.  2 Sheets—Sheet 2.
BICYCLE.
No. 506,741.  Patented Oct. 17, 1893.
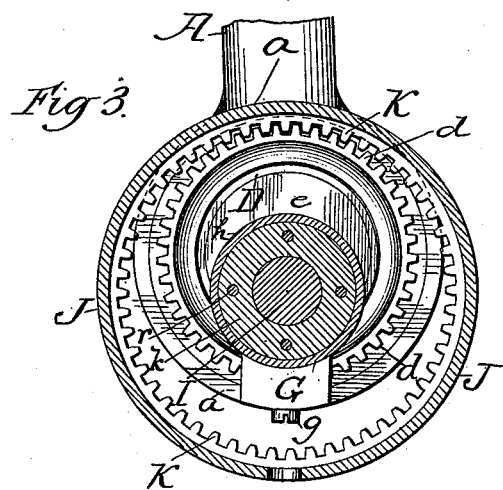
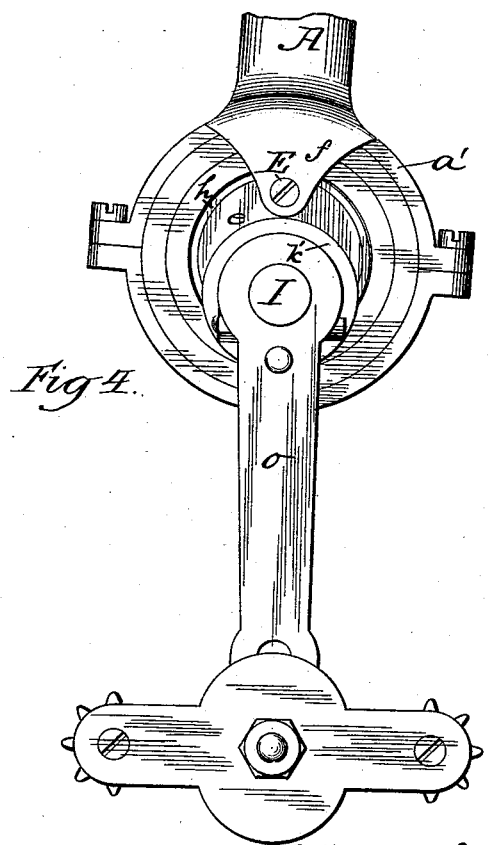
Witnesses
Wm. F. Henning
Thos. M. Rheem
Inventor
William Church Smith
by Frank H. Thomas, Attorney

UNITED STATES PATENT OFFICE.

WILLIAM C. SMITH, OF GOSHEN, INDIANA.

BICYCLE.

SPECIFICATION forming part of Letters Patent No. 506,741, dated October 17, 1893.

Application filed June 13, 1892. Serial No. 436,639. (No model.)

*To all whom it may concern:*

Be it known that I, WILLIAM CHURCH SMITH, of the city of Goshen, in the county of Elkhart and State of Indiana, have invented certain new and useful Improvements in Bicycles, of which the following is a full, clear, and exact description, reference being had to the accompanying drawings, and to the letters of reference marked thereon.

Heretofore geared "ordinaries," that is, bicycles having a large front wheel and a small trailer, have required a link chain belt and sprockets and an independent crank on each side to operate it, the idea being that it was impossible to directly connect the cranks, and thereby dispense with one set of actuating devices, and to propel the drive wheel by connecting devices on one side only, because the wheel and hub interfered. My invention is in direct contravention to this supposition, and because of this fact does not require the reducing of the diameter, and permits the "gearing up" of the drive wheel to almost any power or speed desired, while at the same time removing to an appreciable extent the dangerous tendency of ordinaries to take "headers," substantially as hereinafter fully described, and as illustrated in the drawings in which—

Figure 1, is a side elevation of an "ordinary" bicycle having my improvements applied thereto. Fig. 2, is a transverse central section through the hub thereof. Fig. 3, is a transverse section taken on dotted line 3, 3, Fig. 2, looking toward the wheel, and Fig. 4, is a side elevation of the opposite end of the hub.

In the drawings A represents the forks of the front drive wheel B of an ordinary bicycle, which are provided at their lower extremities with circular bearings $a, a'$, for the reception of the annular cones $b$. There is a right and a left cone $b$, preferably, screwed into each bearing frame by means of a spanner, or otherwise, and the anti-friction balls $c$ are placed between and roll against the inner beveled surface of said cones, and travel in a circumferential concave seat $c'$ made with reference thereto in the part of the hub C extending out beyond the point at which the spokes of the wheel B are secured, as shown.

The hub C is made greater in diameter than the hubs of high front wheels in "ordinary" bicycles usually are, and its inner circumference is, preferably, the same diameter throughout its entire length. Its end adjacent to the bearing frame $a'$ terminates about on the same vertical plane as the outer faces of the cones $b$ therein, but its opposite end extends beyond its bearings and is provided with a gear $d$ the cogs of which project from its periphery in a radial line.

Placed concentrically within and conterminous with the hub C is the tube D, which provides the necessary support for the bearings of the crank spindle I. Tube D is of a diameter just sufficient for it to be placed within the hub, and has its ends plugged up by suitable heads $e, e$. This tube is stationary, and is prevented from turning by means of a set-screw E at one end and a set-screw $g$ at the other. Said screw E passes laterally through the lug $f$ depending from the upper segments of the bearing frame $a$, and is tapped longitudinally into the contiguous head $e$ of the tube D. The set-screw $g$ passes radially through the extremity of the arm G into the side of the outer flared portion of the bell-shaped bearing-case $h$. This arm G projects laterally outwards from the lowest segments of the bearing frame $a$ a distance sufficient to carry it beyond the adjacent end of the hub, and is then turned radially inward until it touches the bearing-case $h$. The bearing-case $h$, is brazed or otherwise made fast to the head $e$ in the adjacent end of the tube; thus, when the screw $g$ is tapped into it, the effect is the same as if said screw $g$ were tapped direct into the adjacent head $e$. There is a corresponding bearing-case $h$, brazed or otherwise secured into each end of the tube D, and these cases are eccentric to said tube and are placed in horizontal transverse alignment with each other. Passing longitudinally through these cases $h$ and said tube, is the crank spindle I, which is of such diameter that it does not come in direct contact with the inner circumference of the inner narrower portion of the bell-shaped cases $h$. The spindle is held concentric in the bearing cases by means of anti-friction devices consisting of the cones $k, k'$, and the balls $n$. The cone $k$ is made fast to that end of the spindle which is located on the same side as the geared end of the hub C, and the cone $k'$ is screwed onto the screw-threaded portion of the opposite end of the spindle, so as to permit of the longitudinal adjustment of said spindle and so as to tighten up the bearings when necessary. The balls $n$ are seated in and between the inverse angle of the flared outer portion of the bell-shaped bearing-cases, and the inner curved or beveled faces of the cones, as shown. The end of the spindle onto which the cone $k'$ is screwed extends beyond the same and has a pedal crank $o$ secured thereon in any suitable manner. The opposite end of said spindle extends but slightly beyond the cone $k$ and has secured concentrically thereto the cup-shaped boss J, the diameter of which and the length of the cylindrical sides of which are such that they extend back over the gear $d$, and so that their annular edges are on the same vertical plane as the inner edge thereof. The inner circumference of the sides of this boss is provided with an annular gear K the uppermost segment of which engages with gear $d$, as shown in Fig. 3. Projecting from the boss J in a direction opposite to that in which the pedal crank $o$ projects from the opposite end of spindle I, is the pedal crank N. Thus, the rider applies the power to the drive wheel continuously at one point, and is able to utilize his strength to better advantage than when the propelling force is applied at two disconnected points to the wheel, as is the case at present.

It is obvious that for the purposes of a cheap wheel, the anti-friction devices in the bearing frames $a$, $a'$; the bearing cases $h$; balls $n$ and cones $k$, $k'$, can all or separately be dispensed with.

As it might be desirable to fasten the boss J more securely to the spindle I when the cones $k$, $k'$, are used, I strengthen the connection by tapping the headless or countersunk screws $r$, $r$, through the face of the boss into cone $k$, as shown in Fig. 2. While desirable, however, this is not absolutely necessary.

What I claim as new is—

1. The combination in a bicycle, with the forks A, wheel B, and the hollow hub thereof, one end of which extends beyond its bearings, of the stationary tube D placed concentrically within said hub, spindle I journaled eccentrically within said tube and pedal cranks secured to the ends thereof, and suitable gear connecting said spindle to the extended end of said hub, as set forth.

2. The combination in a bicycle, with the forks A, wheel B, and the hollow tube thereof having one of its ends extending beyond its bearings, and having a gear in its periphery, of the stationary tube placed concentrically within said hub, spindle I journaled eccentrically within and extending through said tube and having a pedal crank on one end thereof, and boss J secured to the other end of said spindle I and having a pedal crank projecting therefrom and having an annular gear on the inner circumference of its cylindrical sides which engages gear $d$, as set forth.

3. The combination in a bicycle, with the forks A, having bearings in their lower ends, and provided with lug $f$ and arm G, respectively, the wheel B, and the hollow hub C thereof, one end of which extends beyond its bearings, of the stationary tube placed concentrically within said hub, and secured by said lug $f$ and arm G, as described, and spindle I journaled eccentrically in and extending longitudinally through said tube pedal cranks on the ends thereof, and suitable gearing connecting said spindle with the extended end of said hub.

4. The combination in a bicycle, with the forks A, having bearing frames in their lower extremities, and provided with lug $f$ and arm G, respectively, the wheel B, and the hollow hub thereof having one end extending beyond its bearings, of the stationary tube D placed concentrically within said hub and provided with heads $e$, which plug up its ends, and secured by said lug $f$ and arm G, and spindle I journaled eccentrically in and extending longitudinally through said tube pedal cranks on the ends thereof, and suitable gear for connecting said spindle with the extended end of said hub.

5. The combination in a bicycle, with the forks A, having bearing frames in their lower ends, cones $b$, therein, balls $c$, and the hollow hub C having one end extending beyond its bearings, of the stationary tube placed concentrically within said hub, the spindle I journaled eccentrically in and extending through said tube, and pedal cranks on the ends thereof, and suitable gearing for engaging and imparting the motion of said spindle to said hub, as set forth.

6. The combination in a bicycle with the forks A, having bearing frames in their lower extremities, the wheel B, and the hollow hub journaled in said bearing frame, of the stationary tube placed concentrically within said hub, bearing cases $h$ permanently secured in the ends of said tube, spindle I, pedal cranks on the ends thereof, cones $k$, $k'$, and balls $n$, and suitable gearing for imparting the motion of said spindle to the extended end of said hub, as set forth.

7. The combination in a bicycle, with the forks A, having bearing frames in their lower extremities, cones $b$, therein, balls $c$, and the hollow hub having one end extending beyond its bearings, of the stationary tube placed concentrically within said hub, bearing cases $h$, and cones $k$ and $k'$, and balls $n$, and suitable gearing for imparting the motion of said spindle to the extended end of said hub, as set forth.

8. The combination in a bicycle with the forks A, having bearing frames in their lower extremities, and provided with lug $f$ and arm G, respectively, cones $b$ in said bearing frames, balls $c$, and the hollow hub C having one end extending beyond its bearings, of the stationary tube D placed concentrically within said hub, bearing cases $h$, cones $k, k'$, and balls $n$, and suitable gearing imparting the motion of said spindle to the extended end of said hub, as set forth.

9. The combination in a bicycle with the forks A, having bearing frames in their lower ends and provided with lug $f$ and arm G, respectively, cones $b$ within said bearing frames, balls $c$ and the hollow hub C having one end extending beyond its bearings, of the stationary tube D placed concentrically within said hub, the bearing cases $h$, spindle I and boss J having an annular gear in the inner circumference of its cylindrical sides which engage with the gear on the periphery of the extended end of said hub, as set forth.

WILLIAM C. SMITH.

Witnesses:
GEO. W. RICH,
P. C. PAUL.